Dec. 22, 1942.  A. B. JOHNSON  2,306,313
HAY RAKE AND LIFTING MEANS THEREFOR
Filed Sept. 24, 1941  3 Sheets-Sheet 3
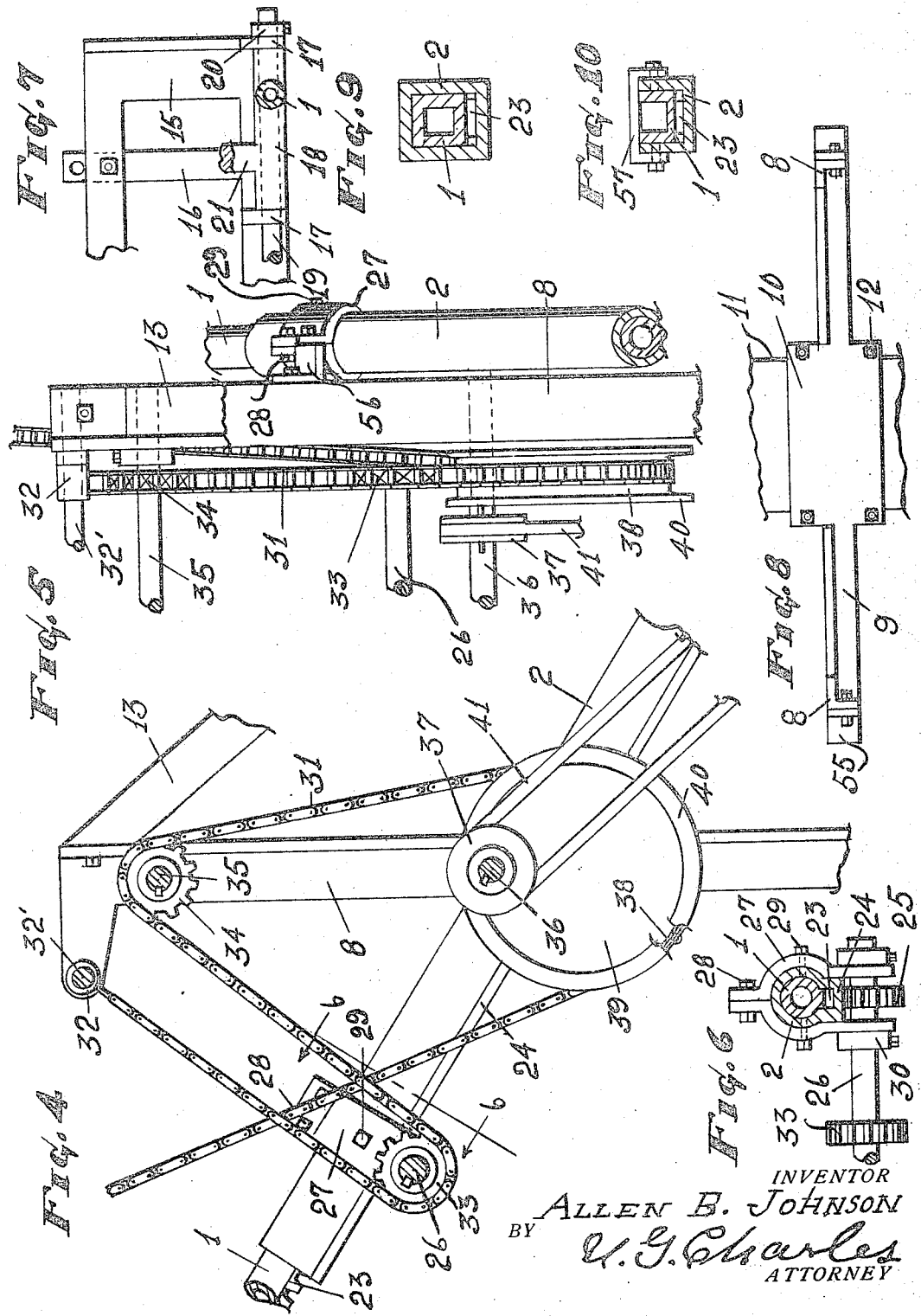
INVENTOR
ALLEN B. JOHNSON
BY
U. G. Charles
ATTORNEY Patented Dec. 22, 1942

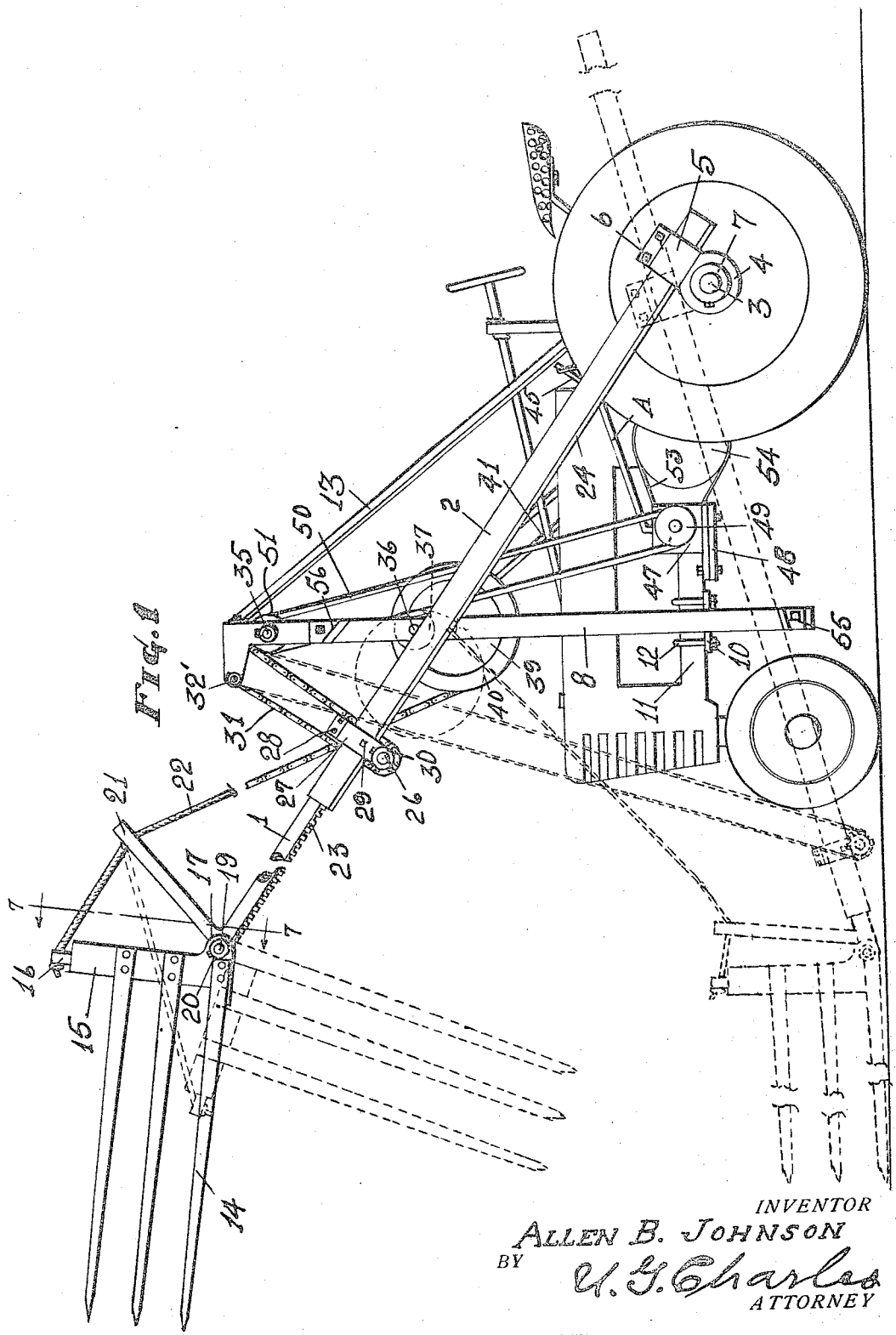

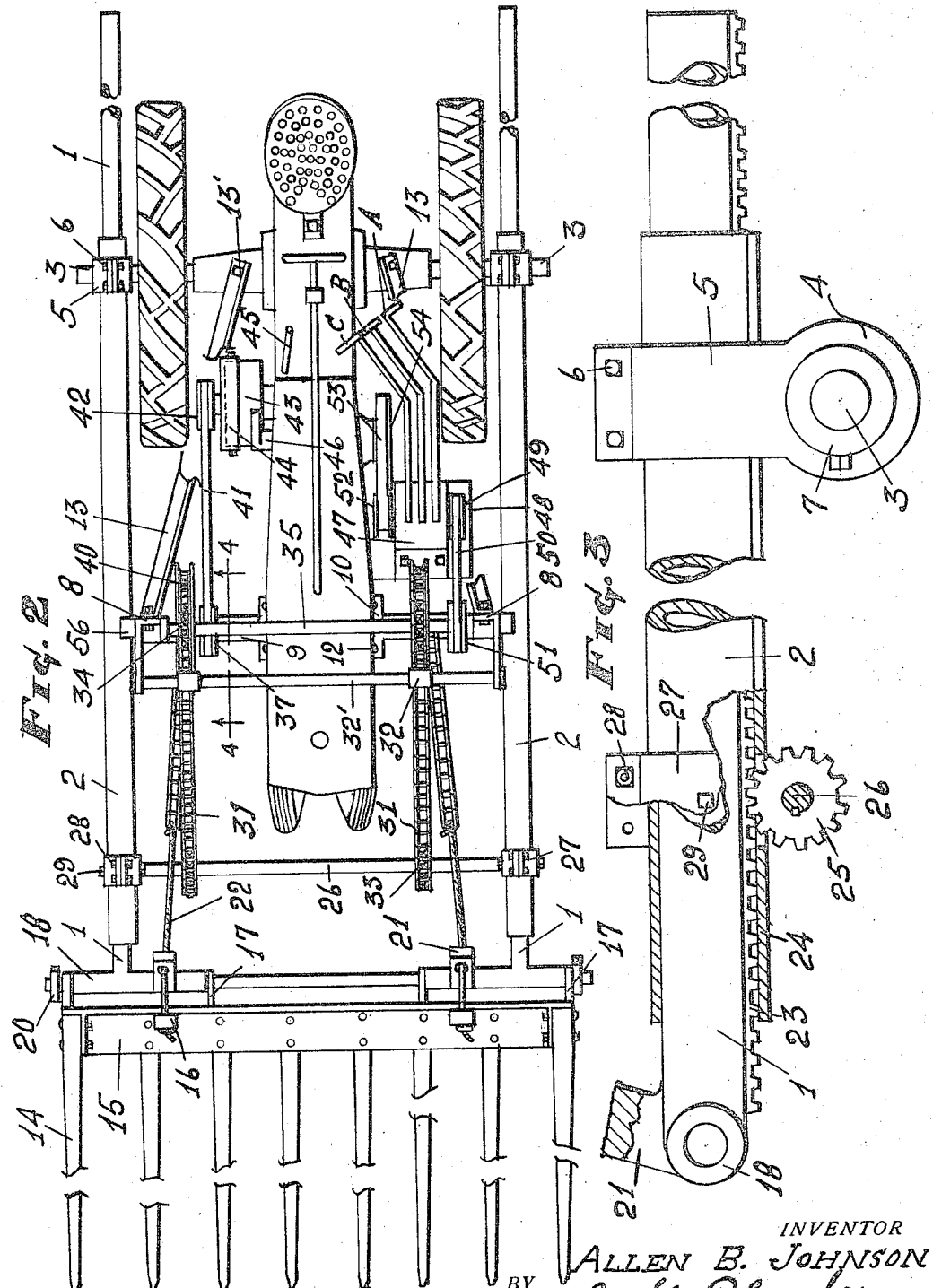

2,306,313

UNITED STATES PATENT OFFICE 2,306,313

HAY RAKE AND LIFTING MEANS THEREFOR

Allen B. Johnson, Galva, Kans.

Application September 24, 1941, Serial No. 412,076

2 Claims. (Cl. 214—141)

My invention relates to a hay rake and lifting means therefor, and has for its principal object to provide an efficient elevating mechanism to raise and lower a carrying means, said elevating mechanism being removably attached to a present make of tractor and being actuated thereby.

A further object of this invention is to provide a hay rake that may be placed in front of a tractor to sweep up mowed hay, or the like from a field as the tractor is moved thereover, and a pair of telescopically engaging arms rockably arranged on the tractor to elevate the rake when loaded with hay, to a stack, or any place where the hay is desired to be discharged from the rake.

Another object of this invention is to provide a power transmission arrangement that is adaptable for the elevation of weights, said arrangement having simple and effective means to engage and disengage the same and being appropriately positioned in reach of an operator.

Another object of this invention is to provide a pair of telescopically engaging arms for the elevation of weights, said arms when in a downward position being contracted, but adapted to be lengthened and raised simultaneously at one end; and furthermore to provide a rack and pinion whereby the arms may be easily lengthened and contracted.

Another object of this invention is to provide a lifting mechanism that is compact, inexpensive to construct, and easily applied to a present make of tractor without altering the present arrangement of the tractor for the elevation of hay rakes and other carrying devices, such as scrapers, grapples, and manure loaders, which may be rockably arranged on the lifting mechanism in any suitable manner to gather up their respective substance.

These and other objects will hereinafter be more fully explained, reference being had to the accompanying drawings forming a part of this specification, and in which like characters will apply to like parts in the different views.

Referring to the drawings:

Fig. 1 is a side elevation of a hay rake and elevator therefor as arranged on a tractor, parts removed for convenience of illustration, and the rake and arms being shown in a downward position by dotted lines, and in an upward position by solid lines.

Fig. 2 is a plan view of the invention with the elevating arms in a contracted position, and parts removed for convenience of illustration.

Fig. 3 is an enlarged longitudinal view of a pair of telescopically engaging arms, parts removed for convenience of illustration.

Fig. 4 is a fragmentary view of one pair of arms and standard, taken on line 4—4 in Fig. 2.

Fig. 5 is a transverse view to that of Fig. 4.

Fig. 6 is a sectional view through the arms taken on line 6—6 in Fig. 4.

Fig. 7 is a fragmentary rear view of the hay rake as taken on line 7—7 in Fig. 1.

Fig. 8 is an inverted end view of the standards and means to support the same to a tractor frame.

Figs. 9 and 10 are cross sectional views of modified forms for the elevating arms.

The invention herein disclosed consists of an inner arm 1 and an outer arm 2 positioned on each side of a tractor, said arms telescopically arranged to function as a boom for the raising of weights, one end of each of said arms 2 being rockably connected on the end of its respective rear axle 3 of the tractor through the medium of bearing support comprised of an annular ring 4 integrally joined to a pair of arcuate bars 5 to extend around the outer arm 2 and rigidly secured thereto by bolts 6 engaging through apertures at the outer free ends of the bars, said support being retained against side movement by a stop collar 7 positioned on each side thereof and rigidly secured to the axle, whereby the axle, as the tractor is moved, will be free to turn in the support, and to allow the forward or free end of the arms to be raised or lowered independently of the movement of said axle 3.

The arms are preferably made from tubular elements, 2, being of greater diameter than that of arm 1 to receive the same therein for a longitudinal reciprocating movement, and said arms 2 being shorter in length than arms 1, but sufficient in length to extend past the forward end of the tractor for purpose later described, and will be used as the elevating or lifting arm, while arm 1 will function as an extension to move outward of arms 2 to increase the height of an object to be raised, and the rear end of arm 1 will extend outward from arm 2 when in contracted position sufficient to avoid contact with the ground as the free ends of the arms are being raised.

Extending upward and vertically positioned on each side of the vehicle and being near the forward end thereof is a standard 8, said standards near their lower ends being secured to a cross bar 9 having a plate 10 integrally joined intermediate of its ends to engage beneath the edges of side bars 11 of the tractor frame, and secured thereto by a pair of hook bolts 12 engaging over the edge of each said bar, the upper ends of the standards being braced by slantingly positioned angle bars 13 and secured to the rear of the vehicle as at 13'. It will be seen that each standard is adjacent its respective elevating arm, the upper end of each standard being used as the anchor, or fixed position, to raise and lower its respective free end of the elevating arm, the method of raising being later described.

By using arms on each side of the vehicle, which are sometimes commonly termed as gin poles, twisting of the same will be avoided and will produce a uniform hoist for objects of considerable weight.

The forward ends of the extension arms 1 have rockably secured thereto a hay rake to sweep up hay when the tractor moves and when the arms are retracted and in a downward position as shown by dotted lines in Fig. 1. The rake consists of the usual tines 14 appropriately secured to a frame structure 15, said frame structure having an upright 16 secured near each side thereof to function as levers to rock the rake for discharging its contents and to retain the rack in a normal raking position.

Rearwardly extending and integral with the frame of the rake is a pair of ears 17 for each extension arm 1 between which is positioned a sleeve 18 that is secured to said extension arm, said ears being apertured and in alignment with the sleeves so that a rod 19 may be inserted through said ears and sleeves to rockably carry the rake on the free ends of the extension arms, said rod 19 having collars 20 on its ends to retain the rod from outward movement.

Secured to each sleeve 18 adjacent each upright 16 and extending upward from the sleeve is an arm 21, the upper end of which is apertured to function as a guide for a cord 22 engaging therethrough which is attached to the upper end of the upright whereby when the cord is pulled and released the rake will be tilted upward and downward respectively.

The extension arms 1 each at its lower side has a rack 23 secured thereto by welding to slidably engage in a channel 24 formed in the lower side of its elevating arm 2, said rack being in mesh with a pinion 25 that extends through an opening in the channel as shown in Figs. 3 and 6, said pinion being keyed to a shaft 26 and held in position by a pair of apertured plates 27 receiving the end of shaft 26 and extending upward and around the arm 2, and tensioned together at the upper ends by bolts 28, and having screw bolts 29 extending through the intermediate portion of the plates and threadedly engaging in the wall of said arm as a further tightening means for the plates to the arm. There is also provided a collar 30 to seat on each side of said plates 27 as a means to avoid side movement of the shaft 26. It will now be seen that when the pinion 25 is turned by the shaft, the extension arm will slide longitudinally in the elevating arm, the purpose of which is to contract the arms when gathering up hay and lengthen the arms to elevate the hay at a desired height and then discharge as the cord 22 is released.

To raise each elevating arm 2 and turn the shaft 26 simultaneously is through the medium of a chain 31, one end being anchored to the upper end of its respective standard through the medium of a sleeve 32 positioned on a rod 32' that extends from standard to standard, said chain extending downward therefrom and engaging over a sprocket wheel 33 that is secured to said shaft 26, and from thence said chain running upward and around sprocket wheel 34 that functions as a fixed wheel, said wheel 34 being keyed to a drive shaft 35, said shaft extending from standard to standard and having its ends trunnioned therein. Said chain extends downward from sprocket wheel 34 and engages around an idler and then extends upward toward the cord 22 to which it is secured. The idler is eccentrically secured to a shaft 36 and having a sheave 37 to turn the same as mounted on the shaft. The purpose of the idler is to release the tension on the cord 22 by reason of the eccentric action, permitting the rake to rock so that the contents may be discharged, during which time the upper shaft 35 is retained against turning movement to hold the arms in an elevated position for dumping.

To permit free wheeling of the chain on the idler it will be seen in Fig. 4 that the chain engages over a ring element 38 that slidably engages on the periphery of a disc 39 to which the shaft 36 is eccentrically secured, said ring element 38 having flanges 40 inwardly and outwardly projecting from its ends thereof, the inner flanges to seat over the sides of the disc to retain the ring portion 38 thereon, the outer flanges being means to retain the chain from jumping off as the machine is in operation.

Said sheave 37 is turned by belt 41 engaging thereon and over a sheave 42 that is turned and secured to the belt pulley 43 of the tractor, said sheave 42 being secured to the belt pulley 43 through the medium of a flanged disc 44, the flanges seating over the periphery of the pulley 43 and set by screw bolts threadedly engaging through the flange and against the pulley 43. Said pulley 43 is driven by the motor of the tractor when a usual lever as at 45 is operated, and when released the belt pulley is braked by a shoe element 46 in the usual manner as equipped with the tractor.

To rotate the upper or fixed shaft 35 and its sprocket wheels 34 is a suitable transmission 47 carried by a platform 48 appropriately secured to the bottom of the tractor frame but not shown in the drawings, said transmission having a sheave 49 and a belt 50 to transmit power to a sheave pulley 51 that is secured to the fixed shaft 35. The transmission has another sheave 52 to be turned by a belt 53 that engages over the flywheel 54 that rotates continuously with the motor. To control the transmission is by levers A, B, and C, one lever being for the raising of the arms, another for lowering, while the remaining one is for stopping the arms at desired position.

In Fig. 1 is shown a stop element 55 secured to the lower end of each standard to function as a rest for the arm in its downward position, there being another stop element 56 secured near the upper end of each standard to restrict the upward movement of the arms.

The dotted lines in Fig. 1 illustrate the starting position to rake up hay, the arms being lowered and shortened so that the rake may be in close proximity to the forward end of the tractor and being an advantage in starting to raise the load. As stated previously that when the tractor is advanced over a field of mowed hay, the rake will rake up the hay and deposit the same thereon, and when the rake has been filled, the tractor belt pulley 43 is engaged by the action of the operator to turn the idler, whereby the cord 22 and portion of the chain connected thereto will be pulled rearward by reason of the eccentric arrangement, by which action, the rake will be tilted back to avoid further contact with the ground. In such position, the rake with the hay is moved toward a stack or place of discharge for the hay, during which movement lever A, for example, may be pressed, causing the fixed sprocket wheel 34 to rotate in a direction to roll the free end of the chain thereover and lift the elevating arms, due to the reason that the length of the chain from the fixed end thereof around the movable sprocket 33 and back to the fixed sprocket 34 will be shortened and transferred to the length of the chain extending from the idler to the rake, and as the movable sprocket wheel 33 is turned while moving upward, the same will cause the pinion to advance outward, the rack carrying the extension arm therewith. When the rake is at a proper height and place, the lever B is pressed and A released to stop and retain the arms in their elevated position, after which the belt pulley 43 is again engaged to turn the idler and trip the rake as shown by dotted lines in Fig. 1, and after the contents have been discharged, the idler is turned to raise the rake and take up the slack of the chain. The pulley is now braked, and lever C may be engaged to rotate the fixed sprocket wheel 34 in an opposite direction from that to raise the load, by which action the arms will be lowered and contracted simultaneously. When the arms have found their resting place, all of the levers are released for a repeated fill of the rake as engaged on the ground.

In Fig. 9 is shown a modification for the form of the arms, in which case both arms are rectangular in cross section, the inner arm having the rack welded thereto to engage on the inner wall of the lower side of the outer arm.

In Fig. 10 is shown another modification for the form of the arms, wherein the arms are channel-like in cross section, one being smaller to engage in the other and having guide member 37 secured to the outer members to retain the inner member slidable therein.

While I have shown a rake attached to the forward ends of the extension arms, I do not wish to be restricted to such alone, as different devices such as grapples and scrapers may be substituted for the rake to perform their specific function, and in some instances wherein a tractor is employed for the operation of the elevating arms that isn't equipped with a convenient belt pulley such as 43 in the drawings to trip the hay rake for the unloading of its contents, in which case shaft 36 may be turned by a belt directly connected to the motor of the tractor or to transmission 47, and having a clutch to disengage the shaft 36 from its sheave 37, and furthermore the idlers may be substituted by a gripping device located at the lower end of each standard for the purpose of releasing the cord to rock the hay rake (however, such arrangements not being shown in the drawings.)

Such other modifications may be employed as lie within the scope of the appended claims.

Having fully described my invention what I claim as new and desire to secure by Letters Patent is:

1. In a device of the class described, said device adaptable to be operated by a motor-driven vehicle, and comprising an elevating arm on each side of the vehicle, supporting means to secure one end of each elevating arm rockably at the rear of the tractor, a standard secured near the forward end of the vehicle for each elevating arm, a chain and means to secure one end rigid at the upper end of each standard, a shaft and means to secure the same to the free ends of the arms rotatably, a sprocket wheel for each chain secured to said shaft, a fixed shaft trunnioned in the upper ends of the standards, a fixed sprocket wheel for each chain secured to the last said shaft over which said chain will continue, another shaft trunnioned in the standards a short distance downward from the upper shaft, an idler eccentrically connected to last said shaft over which the chain will engage, an extension arm telescopically engaging in each elevating arm, a rack secured to the under side of each extension and a pinion secured to first said shaft to engage with the rack as contraction and extending means for the arms, a hay rake rockably secured to the forward ends of the extension arms, means to secure the other end of the chain to the hay rake to control the rocking thereof, a belt and a sheave to transmit power from a belt pulley of the tractor to turn the idler for releasing and tensioning of the free end of the chain, a transmission carried at one side of the vehicle, and belt means to transmit the power from the transmission to the upper fixed sprocket wheel to roll and unroll the chain thereon and causing the free end of the elevating arms to selectively raise and lower the extension arms to extend and contract for the purpose specified.

2. In a device of the class described, said device adaptable to be operated by a motor-driven vehicle, and comprising an elevating arm on each side of the vehicle, supporting means to secure one end of each elevating arm rockably at the rear of the tractor, a standard secured near the forward end of the vehicle for each elevating arm, a chain and means to secure one end rigid at the upper end of each standard, a shaft and means to secure the same to the free ends of the arms rotatably, a sprocket wheel for each chain secured to said shaft, a fixed shaft trunnioned in the upper ends of the standards, a fixed sprocket wheel for each chain secured to the last said shaft over which said chain will continue, another shaft trunnioned in the standards a short distance downward from the upper shaft, an idler supported by the standards for each chain and means to rock the idler for releasing and tensioning the other end of the chain, an extension arm telescopically engaging in each elevating arm, a rack secured to the under side of each extension and a pinion secured to first said shaft to engage with the rack as contraction and extending means for the arms, a carrying device rockably secured to the forward ends of the extension arms, means to secure the other end of the chain to the carrying device to control the rocking thereof, a transmission carried at one side of the vehicle, and belt means to transmit the power from the transmission to the upper fixed sprocket wheel to roll and unroll the chain thereon and causing the free end of the elevating arms to selectively raise and lower the extension arms to extend and contract for the purpose specified.

ALLEN B. JOHNSON.